(12) United States Patent
White

(10) Patent No.: US 8,955,747 B2
(45) Date of Patent: Feb. 17, 2015

(54) DEVICES, SYSTEMS AND METHODS FOR WIRELESS POINT-OF-SALE

(75) Inventor: Spencer Neil White, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 950 days.

(21) Appl. No.: 12/615,864

(22) Filed: Nov. 10, 2009

(65) Prior Publication Data

US 2010/0320266 A1    Dec. 23, 2010

Related U.S. Application Data

(60) Provisional application No. 61/219,545, filed on Jun. 23, 2009.

(51) Int. Cl.
| | |
|---|---|
| *G06K 15/00* | (2006.01) |
| *G06Q 20/42* | (2012.01) |
| *G06Q 20/20* | (2012.01) |
| *G06Q 20/32* | (2012.01) |

(52) U.S. Cl.
CPC .............. *G06Q 20/425* (2013.01); *G06Q 20/20* (2013.01); *G06Q 20/3276* (2013.01); *G06Q 20/3278* (2013.01)
USPC .......................................... 235/383; 235/380

(58) Field of Classification Search
USPC ................. 235/383, 380, 382, 492, 486, 487; 705/16, 44, 75, 14.13
See application file for complete search history.

(56) References Cited

U.S. PATENT DOCUMENTS

| | | | |
|---|---|---|---|
| 6,856,975 | B1 | 2/2005 | Inglis |
| 7,024,174 | B2 | 4/2006 | Nagy |
| 7,343,344 | B2 | 3/2008 | Tomoike |
| 7,581,678 | B2 | 9/2009 | Narendra et al. |
| 2004/0058705 | A1 | 3/2004 | Morgan |
| 2009/0271276 | A1 | 10/2009 | Roberts |
| 2009/0298540 | A1 | 12/2009 | Narendra |
| 2010/0121701 | A1* | 5/2010 | Nguyen et al. ............. 705/14.38 |
| 2010/0131415 | A1* | 5/2010 | Sartipi ............................ 705/75 |
| 2011/0042456 | A1* | 2/2011 | Masaryk et al. .............. 235/380 |
| 2011/0137797 | A1* | 6/2011 | Stals et al. ...................... 705/44 |
| 2011/0177852 | A1* | 7/2011 | Jain et al. .................... 455/575.8 |
| 2011/0225057 | A1* | 9/2011 | Webb et al. ...................... 705/16 |
| 2011/0250866 | A1* | 10/2011 | Fisher ............................ 455/410 |
| 2013/0091059 | A1* | 4/2013 | Stals et al. ...................... 705/44 |

\* cited by examiner

*Primary Examiner* — Thien M Le
(74) *Attorney, Agent, or Firm* — Hartman & Citrin LLC

(57) ABSTRACT

Devices, systems and methods are disclosed which relate to executing a transaction at a point-of-sale device using a mobile device. In exemplary embodiments the mobile device reads an identifier from the point-of-sale device through wireless technology such as RFID. The identifier is an IP address, serial number, telephone number, etc. The mobile device prompts the user to input the amount of the sale, a payment method, and an authorization code. Once input, the mobile device sends the information along with the identifier to a payment server which verifies the information. Once verified, the payment server notifies the point-of-sale device that the amount has been transferred. The point-of-sale device prints a receipt for the customer or sends it back through the network to the mobile device.

20 Claims, 9 Drawing Sheets

DEVICES, SYSTEMS AND METHODS FOR WIRELESS POINT-OF-SALE

This application claims priority to U.S. Provisional Patent Application Ser. No. 61/219,545, filed Jun. 23, 2009, the content of which is hereby incorporated by reference herein in its entirety into this disclosure.

BACKGROUND OF THE INVENTION

1. Field of the Invention

The present invention relates to wireless point-of-sale transactions. More specifically, the present invention relates to using a wireless device to conduct a transaction over a wide area network.

2. Background of the Invention

The dominant form of electronic payment today is a magnetic stripe credit card. With these types of cards, the purchaser or the merchant swipes the magnetic stripe through a reader. The magnetic stripe contains account information and other pieces of security code and identification that is captured in the swiping process. This information is sent through the merchant's point-of-sale systems through terrestrial networks. Depending on what type of payment product is used, the information may go through a VISA router, MASTERCARD router, etc., until it ultimately ends up at a payment processor that represents the bank that issued the payment product. The payment processor runs logic behind the scenes to validate that the credit card is an authorized card and that there is either sufficient money in the bank account or a sufficient credit line to support that transaction. The payment processor then returns an authorization code back through the terrestrial networks to the merchant systems to either approve or decline the transaction.

Electronic payments are slowly migrating from the magnetic stripe to a contactless or near-field-communication (NFC) transaction. Contactless transacting is likely to be the dominant form for mobile payments in the future. As these types of transactions gain popularity, there are hardware modifications in the basic scheme that the merchant must make. Typically this requires either changing out certain parts of their point-of-sale devices or getting an add-on reader. This is basically an NFC reader that plugs in to the signature capture devices that exist today. However, this reader is a costly endeavor for a lot of merchants. Current pricing for these readers is around $140 per point-of-sale device just for the hardware. Beyond the hardware, there are software and firmware upgrades that must be accomplished for such a system. These are costly investments for the merchant which many merchants will deem unnecessary as long as the current system works.

Mobile telephones may be used with these NFC readers. The way the industry is going now where the merchant requires this additional piece of hardware, the additional piece of hardware acts as the reader. The hardware generates a magnetic field such that when the mobile telephone is moved into close proximity of that magnetic field the mobile telephone detects that magnetic field either through the energy provided by that field or by the battery of the phone. The mobile telephone powers up a special purpose radio and transmits the payment or other credentials. The point-of-sale device recognizes the mobile telephone and associates it with a source of funds. Once the point-of-sale device has captured the payment credentials, the payment is processed over the terrestrial network in a similar fashion to that described above for a magnetic stripe transaction. However, this is expensive for the merchant.

What is needed is a way to effect mobile payments at the point-of-sale without requiring the merchant to make such a costly investment.

SUMMARY OF THE INVENTION

The present invention provides devices, systems and methods for executing a transaction at a point-of-sale device using a mobile device. In exemplary embodiments the mobile device reads an identifier from the point-of-sale device through wireless technology such as RFID (ex. mobile device reads RFID tag or sticker located on the point-of-sale device) or via a bar code on the point-of-sale device that the mobile device's camera can read. The identifier provides the mobile device with several pieces of information such as a network address for the point-of-sale device (IP or otherwise) and possibly consumer-oriented information such as the store name, location and checkout lane number. The mobile device prompts the user to input the amount of the sale, a payment method, and an authorization code. Once input, the mobile device sends the information via the wireless wide area network (WWAN—a.k.a. cellular network) along with the identifier to a payment server which verifies the information. Once verified, the payment server notifies the point-of-sale device (via the terrestrial network or via the WWAN) that the purchase is authorized. The point-of-sale device prints a receipt for the customer or sends it back through the network to the mobile device.

In one exemplary embodiment, the present invention is a method for performing a wireless transaction at a point-of-sale device using a mobile device. The method includes reading an identifier of a point-of-sale device, receiving an input from the consumer on the mobile device including an amount, a payment method, an authorization code, and the identifier, sending the input through a wireless network to a payment server, wherein the input is forwarded to a payment server which authorizes the transaction, and receiving a confirmation from one of the payment server and the point-of-sale device. The payment server notifies the point-of-sale device of the payment including the amount.

In another exemplary embodiment, the present invention is a system for performing a wireless transaction at a point-of-sale device using a mobile device. The system includes a point-of-sale device having an identifier, a mobile device capable of reading the identifier, a payment logic onboard the mobile device for submitting an amount, a payment method, an authorization code, and the identifier, a central server in communication with the mobile device and the point-of-sale device, and an accounting logic onboard the central server for processing a payment from the mobile device and sending a confirmation to the point-of-sale device. The payment server notifies the point-of-sale device of the payment including the amount.

In yet another exemplary embodiment, the present invention is a computer program stored on a computer readable medium for performing a wireless transaction at a point-of-sale device using a mobile device. The computer program includes a first code segment for reading an identifier of a point-of-sale device, a second code segment for receiving an input including an amount, a payment method, an authorization code, and the identifier, a third code segment for sending the input through a wireless network to a central server, wherein the input is forwarded to a payment server which authorizes the transaction, and a fourth code segment for receiving a confirmation from one of the payment server and the point-of-sale device. The payment server notifies the point-of-sale device of the payment including the amount.

DETAILED DESCRIPTION OF THE INVENTION

The present invention provides devices, systems and methods for executing a transaction at a point-of-sale device using a mobile device. In exemplary embodiments the mobile device reads an identifier from the point-of-sale device through wireless technology such as RFID or via a bar code on the point-of-sale device. An RFID tag or sticker can be scanned by a scanner incorporated within the mobile device, or a camera on the device can be used to read the bar code. In either case, the identifier provides the mobile device with information such as a network address for the point-of-sale device and possibly consumer-oriented information such as the store name, location, and checkout lane number. The mobile device prompts the user to input the amount of the sale, a payment method, and an authorization code. Once input, the mobile device transmits the information along with the identifier to a payment server which verifies the information. Once verified, the payment server notifies the point-of-sale device that the amount has been transferred. The point-of-sale device prints a receipt for the customer or sends it back through the network to the mobile device.

The mobile device uses a wireless connection to connect to a wide area network such as the INTERNET. Thus, the consumer's mobile device initiates the transaction instead of the point-of-sale device. The point-of-sale device simply provides the total amount of money needed to complete the transaction, and the identifier that the payment server uses to identify the register at which the consumer is conducting the transaction. The payment server is connected to the wide area network, as well as to the network to which the point-of-sale device is connected. The payment server processes the payment method and directs funds to the appropriate account. Once the transaction has been verified, the payment server notifies the point-of-sale device that the transaction has been completed for the amount entered by the consumer.

"Mobile device", as used herein and throughout this disclosure, refers to any device capable of wireless communication to a wide area network. Examples of a mobile device include cellular telephones, personal digital assistants (PDAs), portable computers, etc.

"Point-of-sale device", as used herein and throughout this disclosure, refers to any device that is used to conduct a transaction. Examples of a point-of-sale device include cash registers, kiosks, or any other device used to complete a transaction.

Figure 1:
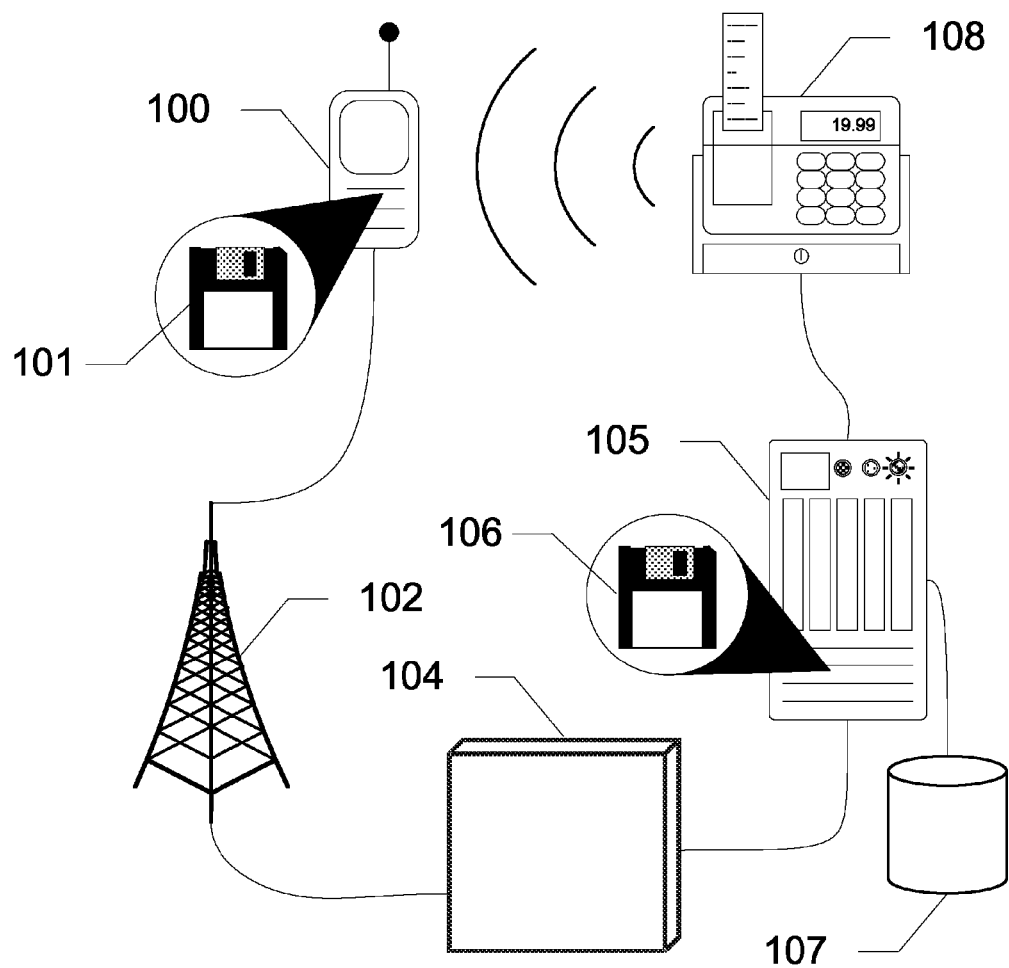
FIG. 1 shows a system for wireless point-of-sale, according to an exemplary embodiment of the present invention.

FIG. 1 shows a system for wireless point-of-sale, according to an exemplary embodiment of the present invention. In this embodiment, the system includes a mobile device 100, a base station 102, a service provider 104, a payment server 105, and a point-of-sale device 108. Point-of-sale device 108 is a device capable of receiving payments from a customer, such as a cash register, kiosk, etc. Point-of-sale device 108 includes an identifier. This identifier may be a serial number, a MAC address, or a network address such as an IP address, telephone number, etc. Mobile device 100 is capable of reading this identifier through a communication with point-of-sale device 108. This communication may be mobile device 100 reading an RFID tag on point-of-sale device 108, scanning a barcode on point-of-sale device 108, etc. Mobile device 100 includes payment logic 101 on a memory onboard mobile device 100, payment logic 101 being programmed to submit an amount, a payment method, an authorization code, and the identifier to payment server 105. Mobile device 100 communicates with payment server 105 via base station 102 and service provider 104. This communication occurs using, for instance, existing 3G technologies, or future equivalents. Correspondingly, service provider network 104 is a wide area network operated by a network operator. The network is in communication with a plurality of servers, including payment server 105. Payment server 105 includes accounting logic 106 and a database 107. Payment server 105 notifies point-of-sale device 108 of a payment from mobile device 100 including an amount. Accounting logic 106 contains instructions for processing payments from mobile device 108 and sending a confirmation to point-of-sale device 108. Database 107 stores account information, routing instructions, identifiers, etc.

In an exemplary embodiment of a method of the present invention, a consumer shops for goods. The items are then rung up at register coupled to POS device 108, and the consumer is prompted by the register to pay. The consumer brings mobile device 100 having, for instance, a NFC reader, to a target location on the register 108. The register target location houses an RFID tag with an identifier, including a unique IP address, or other unique network address, for the register 108. Mobile device 100 captures this merchant information and automatically launches a payment application 101 on mobile device 100. Payment application 101 presents the merchant and the register information for verification. With this information presented, the consumer enters the amount they wish to pay and selects an account to apply the charges. The consumer then enters a PIN to authorize the payment. Mobile device 100 transmits encrypted payment instructions, including the register's identifier and details necessary to validate and authenticate the consumer, over a wireless network 102-104 to a Mobile Payment Gateway. The Mobile Payment Gateway transmits the encrypted payment instructions over terrestrial lines to a payment server 105. This may be a central server or a specific server chosen by the merchant. The payment server 105 validates the request and forwards a payment authorization and a unique transaction ID to the merchant for processing. The payment processor will reconcile the charges with the merchant and the appropriate consumer account at the end of the day. The merchant processes the transaction and the consumer receives a transaction record and possibly any special offers from the merchant. In embodiments of the present invention, actual consumer payment account credentials may have been stored in either the mobile device and/or the payment server systems. This same scheme can be used to redeem coupons/special offers and can also pass merchant loyalty card information.

The present invention may be incorporated in a mobile wallet service, such as that in commonly assigned U.S. patent application Ser. No. 11/727,493, filed Mar. 27, 2007, which is hereby incorporated by reference herein in its entirety. With mobile wallet services, technology is embedded into mobile devices that allow the user to pay for goods and services in a retail environment. Mobile wallets use, for instance, near field communications based off of RFID. Additionally, these mobile wallets can use scanning of barcodes to process transactions as described herein The system of the present invention involves a wireless data network as part of the flow of credit card or other financial information. Exemplary embodiments of the system rely on the ability of the merchant terminal or the point-of-sale device to be addressable through an internet protocol (IP) address. The system utilizes mobile devices with embedded radio frequency identification (RFID) scanners. An RFID tag generally stores information that is transmitted from the RFID tag to an NFC or RFID reader. The RFID reader constantly generates a magnetic field such that when the RFID tag is moved into the magnetic field, the magnetic field induces a current in the RFID tag. In other words, the RFID reader provides a source of power for the RFID tag and the RFID tag uses this to power up a lower power radio transmitter and broadcast a piece of information.

The mobile device can operate in either RFID tag mode or in RFID reader mode. This allows for a scenario whereby, for instance a user goes to a grocery store, gets ready to check out, and the clerk informs the user of the price to be charged. The point-of-sale device 108 has a unique RFID tag or sticker placed on the point-of-sale device 108. These tags can range anywhere from $0.05 to $3.00, so it is a big cost savings over purchasing reader hardware. The mobile device 100 reads the tag, the tag having a unique web address for that terminal. The mobile device 100 initiates a wireless data session and transmits the information over the wireless network 102, 104 to the payment server 105. The payment server 105 sees that the user's phone is transmitting a request to pay, for instance, the terminal number 6 in TARGET store 487 in Atlanta, Ga. The payment server 105 performs a background check by, for instance, verifying an identity of the user, and correspondingly approves or denies the transaction. Then the payment server 105 transmits an authorization message directly to that point-of-sale device 108 or that check-out lane via a wireless or wire-line network. The terminal accepts the payment with the transaction being approved and the user gets their receipt and is on their way.

Figure 2:
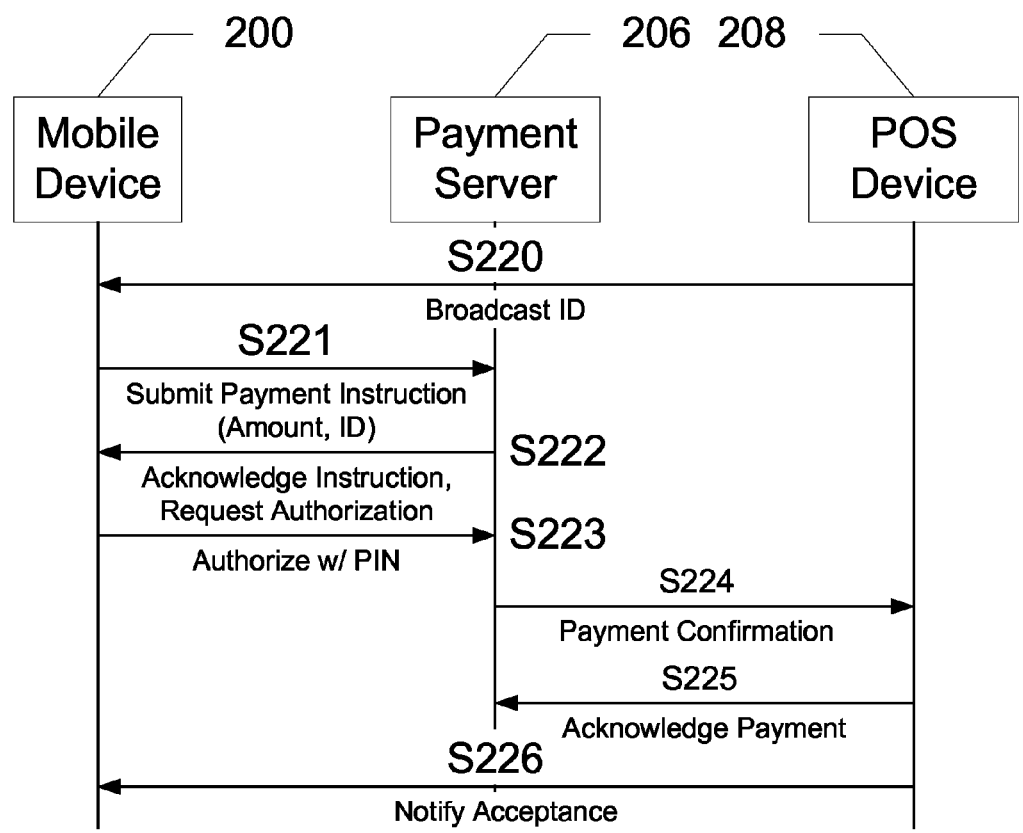
FIG. 2 shows an action diagram, according to an exemplary embodiment of the present invention.

FIG. 2 shows an action diagram between a mobile device 200, a payment server 206, and a point-of-sale device 208, according to an exemplary embodiment of the present invention. In this embodiment, point-of-sale device 208 broadcasts an ID S220 to mobile device 200. This may be accomplished by scanning or detecting an RFID tag coupled to point-of-sale device 208, using mobile device 200. Mobile device 200 then submits payment instructions S221, including an amount and the ID, to payment server 206, across a network such as a one operated by a service provider. Payment server 206 acknowledges the payment instructions and requests authorization S222 from mobile device 200. Mobile device 200 authorizes S223 payment server 206 using a personal identification number (PIN) or other form of electronic identification. Payment server 206 confirms the payment S224 with point-of-sale device 208. Point-of-sale device 208 acknowledges the payment S225 with payment server 206. Point-of-sale device 208 then notifies S226 mobile device 200 of acceptance of the payment.

Figure 3:
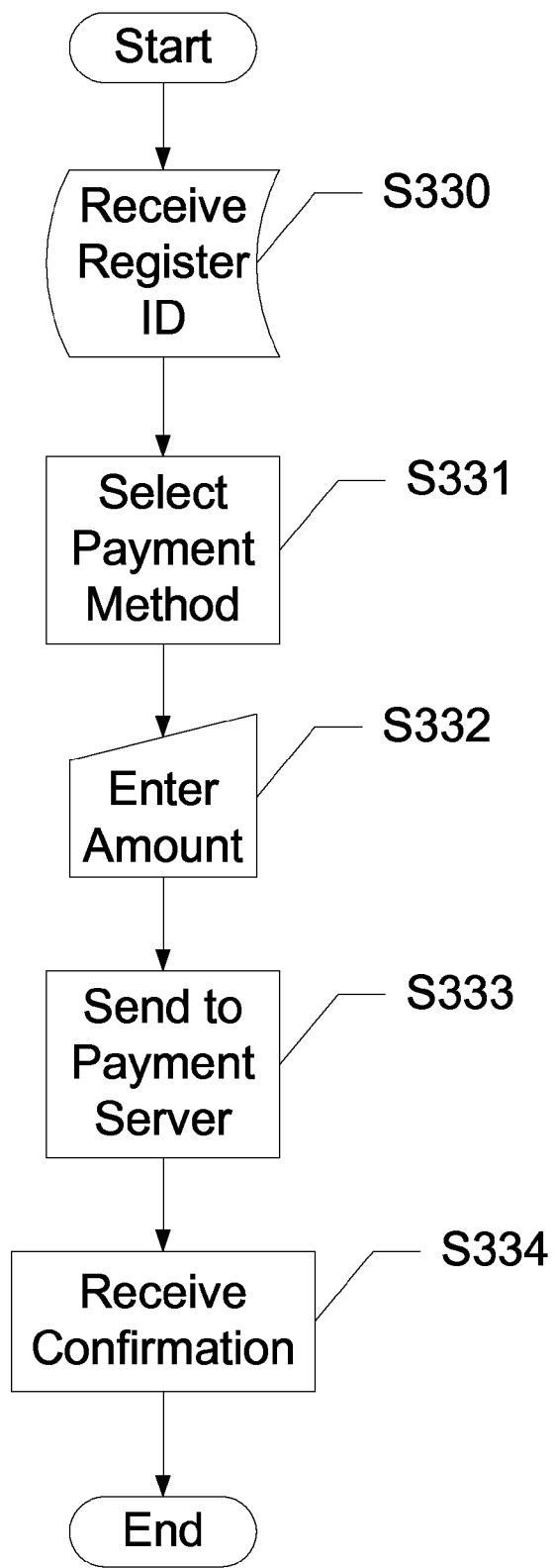
FIG. 3 shows a method for performing wireless transactions, according to an exemplary embodiment of the present invention.

FIG. 3 shows a method for performing wireless transactions, according to an exemplary embodiment of the present invention. In this embodiment, the method begins with a mobile device receiving a register or point-of-sale device ID S330. This receiving may be accomplished by reading an RFID tag, scanning a barcode, receiving a broadcast via NFC, etc. The point-of-sale device ID may be a serial number, an IP address, a telephone number, etc. A user selects a payment method on the mobile device S331. The user then enters an amount for the purchase on the mobile device S332. The mobile device sends the payment information to a payment server S333 for authorization by the payment server. The payment information is sent through a service provider, such as a cellular network, to the payment server. The payment information includes the payment method, payment amount, the point-of-sale device ID, and preferably an authorization code. After sending the payment information, the mobile device receives a confirmation of the payment S334 from either the payment server or the point-of-sale device. This confirmation may be in the form of an electronic receipt.

According to other exemplary embodiments of the present invention, there are other means of interaction between the mobile device and the sale terminal. For instance, BLUETOOTH and barcodes are also possible. Mobile devices may have a barcode scanner or may take a picture of the barcode and decode the barcode to identify the sale terminal. BLUETOOTH also allows an amount to be sent directly to the mobile device, making manual entry unnecessary. Further, the terminal may have a numeric identifier that the user enters into the mobile device.

Figure 4:
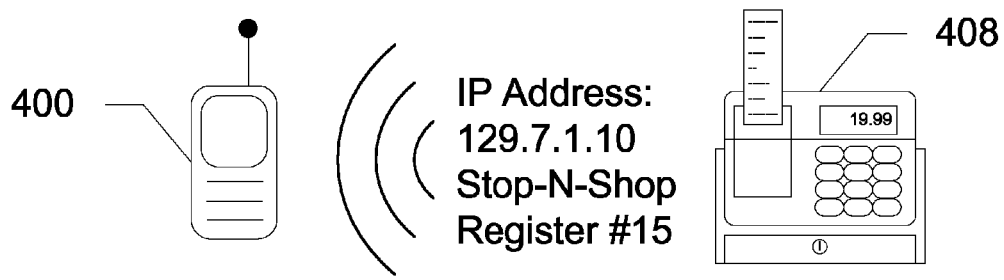
FIG. 4 shows a mobile device receiving an identifier from a wireless point-of-sale device, according to an exemplary embodiment of the present invention.

FIG. 4 shows a mobile device 400 receiving an identifier from a wireless point-of-sale device 408, according to an exemplary embodiment of the present invention. In this embodiment, mobile device 400 wirelessly communicates with point-of-sale device 408. Point-of-sale device 408 broadcasts or transmits an IP address, a store, a store location, a store number, a register number, and/or other identification information to mobile device 400. Alternatively, mobile device 400 queries, using appropriate hardware, an RFID or bar code coupled to POS device 408. Mobile device 400 uses this information as well as payment information to complete the purchase through a payment server as described above.

After an RFID tag of a point-of-sale device is scanned by the mobile device, the mobile device stores the web address of that particular sale terminal, according to some exemplary embodiments of the present invention. The mobile device presents the user with the option to complete the sale. For instance, because the mobile device believes that the user is intending to pay the merchant $45, the mobile device prompts the user to click a button to authorize the transaction or enter a PIN to authorize the transaction. In doing this, the mobile application transmits a message over the wireless network to the payment server to say the transaction has been approved. The payment server authenticates the user, determines that the transaction is legitimate, and sends a notice to the particular point-of-sale device. Thus, these exemplary embodiments of the present invention route the request in a different direction than traditional approaches by using the mobile device as the point of origin of the transaction.

Figure 5:
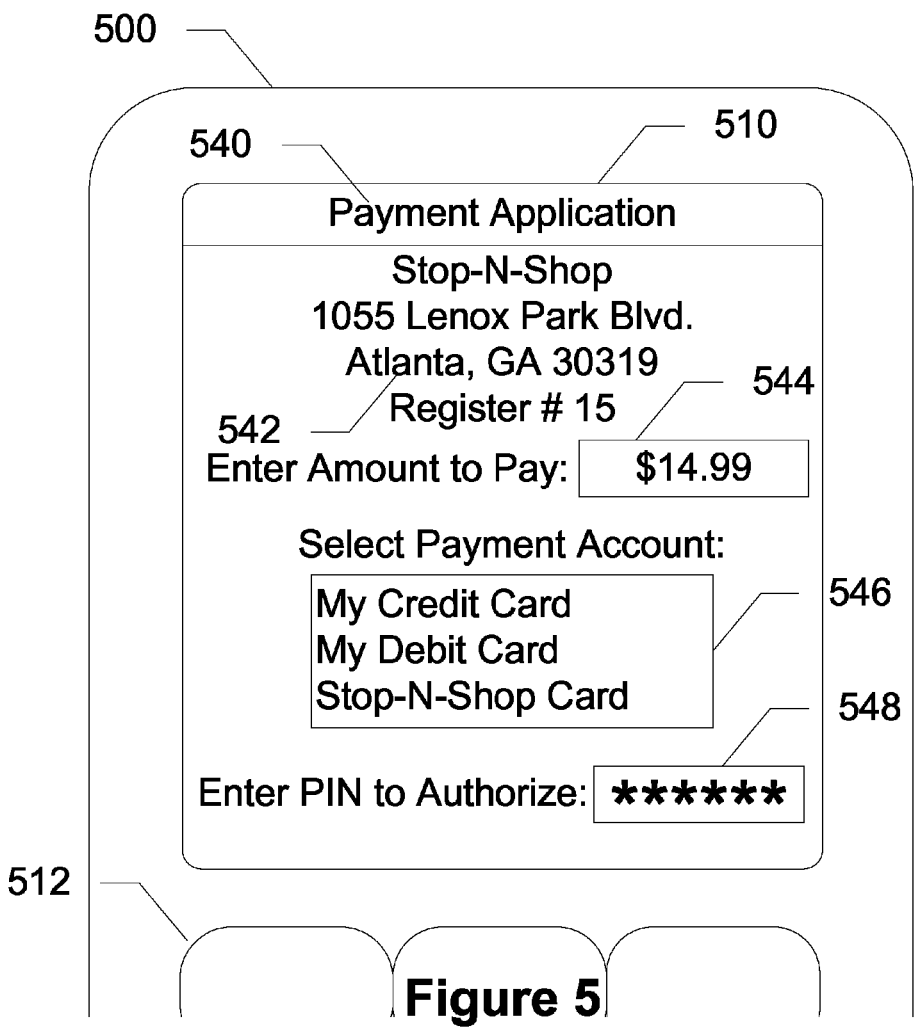
FIG. 5 shows a payment application on a mobile device, according to an exemplary embodiment of the present invention.

A mobile device may further include payment logic stored in the form of a software application on a memory on the device. The payment application can further communicate with a host application on a remote server, such as an application server or a payment server. FIG. 5 shows a payment application 540 on a mobile device 500, according to an exemplary embodiment of the present invention. In this embodiment, payment application 540 includes a user interface displayed on screen 510. Screen 510 displays the information for the register 542, a payment amount entry 544, and presents the user with optional payment methods 546. Screen 510 further displays a field for PIN entry 548. Each of these features may be viewed on display 510 of mobile device 500 and entered or adjusted with a keypad 512 of mobile device 500. Store/register location 542 provides the store, location of the store, register number, etc. This information is retrieved from an identifier of a point-of-sale device, for instance as described with respect to FIG. 4. This information may be stored in a database on a server or on a memory of mobile device 500 such that it is matched with the identifier of the point-of-sale device and viewed on display 510. A payment amount is entered into payment entry 544, allowing a user to choose the amount for payment from a chosen account. The user chooses this account from payment method 546. To ensure that the proper user is making the purchase and not someone else in possession of mobile device 500, an appropriate PIN is required in PIN entry 548. Other screens and commands are possible, such as an edit options command, submit, or cancel transaction command. These commands may further be input via keys 512. Other screenshots for a payment application are shown with respect to the exemplary embodiments of FIGS. 7-10.

Figure 6:
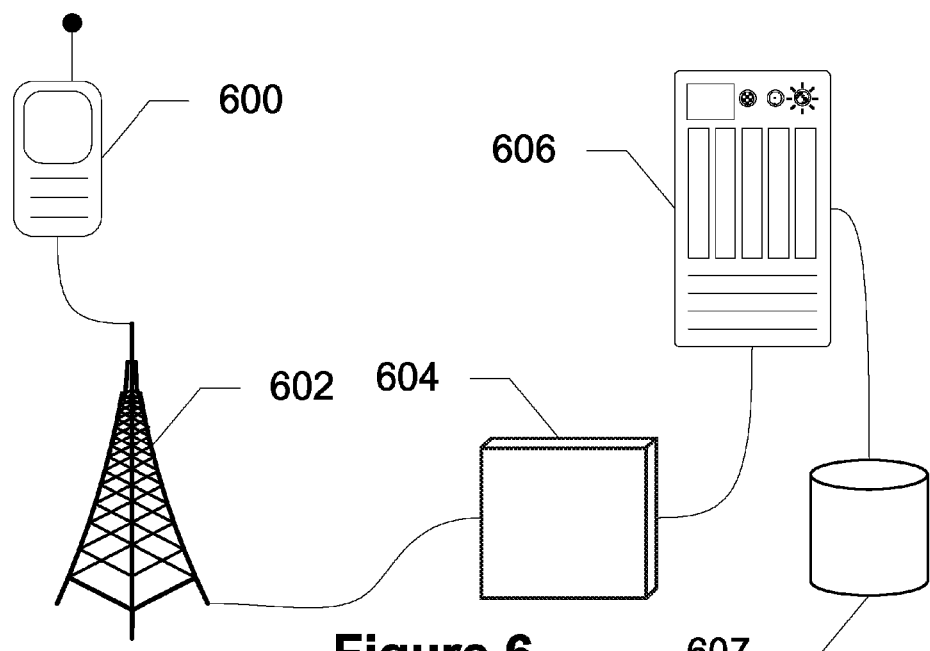
FIG. 6 shows a system for communication between a mobile device and a payment server, according to an exemplary embodiment of the present invention.

FIG. 6 shows a system for communication between a mobile device 600 and a payment server 606, according to an exemplary embodiment of the present invention. In this embodiment, mobile device 600 wirelessly communicates with payment server 606 through a base station 602 and a service provider network 604. Service provider network 604 may be a cellular network and can additionally serve as a mobile payment gateway, thereby including one or more gateway servers enabling communication with a billing/payment system. Mobile device 600 communicates payment information, including a point-of-sale device ID, a payment amount, a payment method, etc. to payment server 606. Payment server 606 receives the payment information and processes the payment information. A database 607 is used to determine the appropriate merchant including the merchant location from the point-of-sale device ID. Database 607 may also include routing information for all financial transactions being accomplished.

Figure 7:
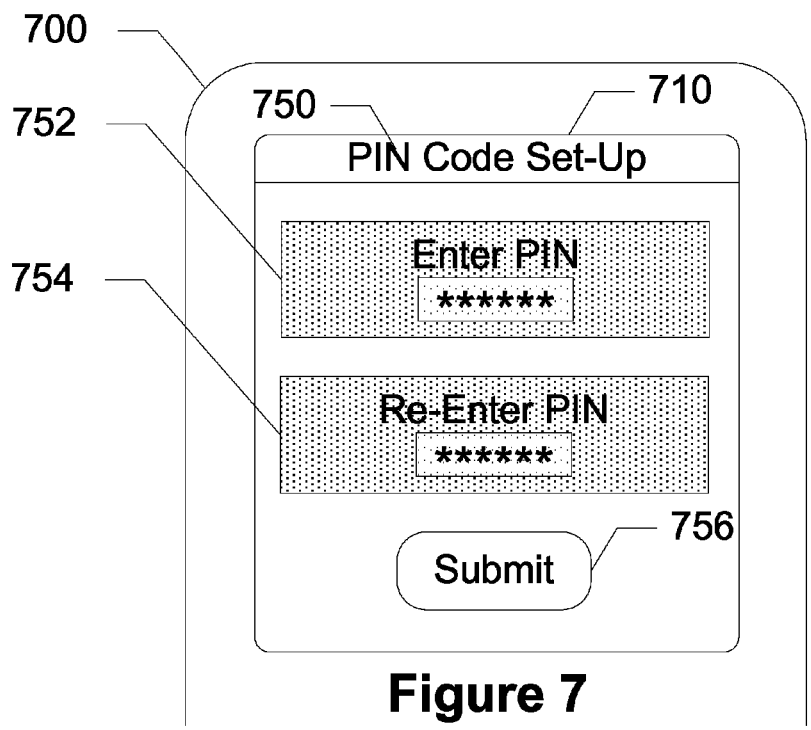
FIG. 7 shows a screenshot of a PIN code set-up on a display of a mobile device, according to an exemplary embodiment of the present invention.

FIG. 7 shows a screenshot of a PIN code set-up 750 on a display 710 of a mobile device 700, according to an exemplary embodiment of the present invention. In this embodiment, when a user sets up an account for mobile payments, the user is prompted to enter a PIN code in PIN code entry field 752. The user must then re-enter the exact same pin code in PIN code re-entry field 754 and submit the PIN code using a submit button 756. If the re-entered PIN code does not match the entered PIN code, the user is prompted to try again. The re-entry ensures that the user did not make any mistakes when originally entering the PIN code. This ensures that the user knows the appropriate PIN code.

Some mobile devices may not have the necessary capabilities to, for instance, scan an RFID tag or barcode of a point-of-sale device. Alternatively, the RFID tag or barcode may not scan properly. In these cases, a manual entry of the point-of-sale device identification is desirable.

Figure 8:
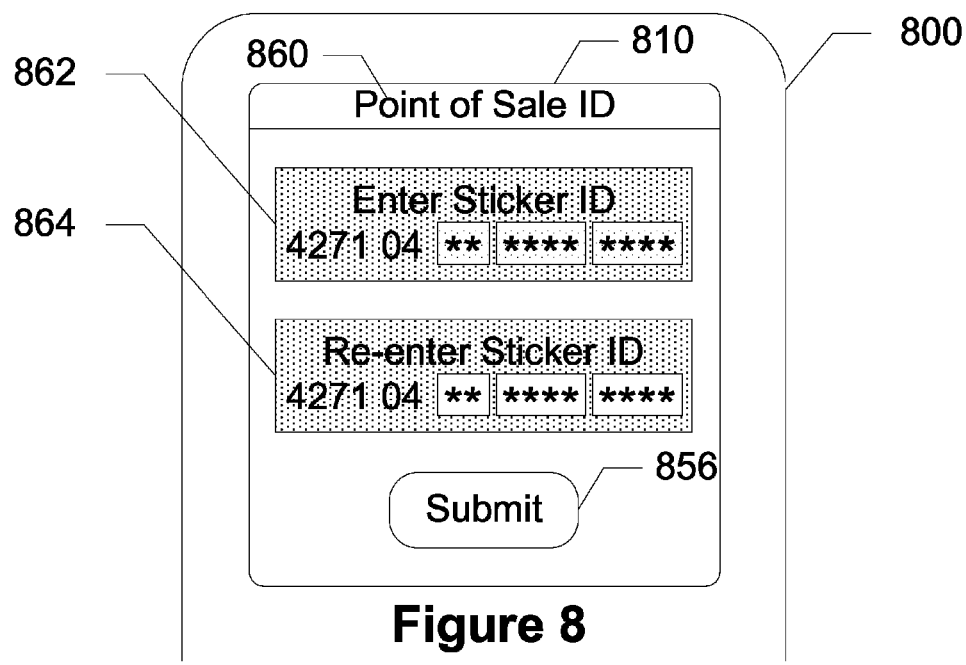
FIG. 8 shows a screenshot for a manual entry of a point-of-sale device ID on a display of a mobile device, according to an exemplary embodiment of the present invention.

FIG. 8 shows a screenshot for a manual entry of a point-of-sale device ID on a display 810 of a mobile device 800, according to an exemplary embodiment of the present invention. In this embodiment, a payment application includes point-of-sale ID 860 screen, which prompts a user to enter an identification of a point-of-sale device in field 862. The user manually inputs a sticker ID in field 862, and is then prompted to re-enter and confirm the identification in field 864. With the identification entered, the user presses a submit button 856, and if the sticker ID is properly entered in both fields, the payment process can be initiated.

Figure 9:
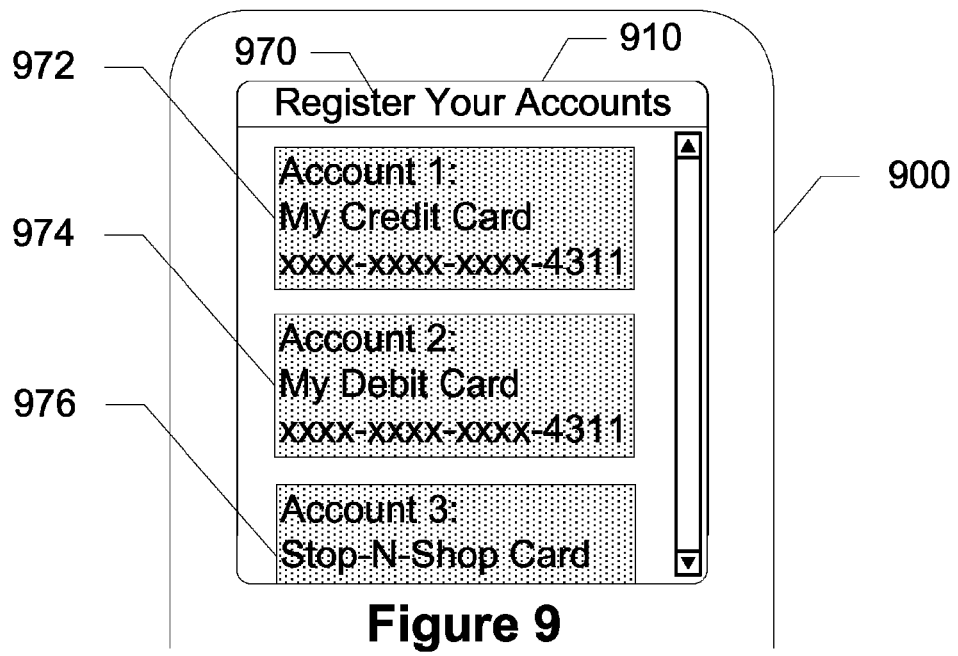
FIG. 9 shows a screenshot of an account registration on a display of a mobile device, according to an exemplary embodiment of the present invention.

The payment application can further store funding/account information for the user, to enable a speedier transaction. To do this, the user must provision one or more payment accounts. FIG. 9 shows a screenshot of an account registration 970 on a display 910 of a mobile device 900, according to an exemplary embodiment of the present invention. In this embodiment, account registration 970 allows a user to enter payment methods which are stored by mobile device 900 and/or a payment server. Account registration 970, as shown, allows a user to enter a credit card account 972, a debit card account 974, and a merchant account 976. Account registration 970 includes the account numbers for these accounts as well as other necessary payment information. Account registration 970 may further allow the user to enter checking account information or other payment methods.

Exemplary embodiments of the present invention provide a record of the transaction. The transaction record may be a notification to the handset that a purchase has been made by a given retailer. This transaction record can be viewed by the consumer as a convenience or a security feature. If the user receives a transaction notification on the handset of something they did not buy, the user knows that an erroneous or fraudulent transaction has taken place. This transaction record may be an electronic receipt which is delivered directly to the mobile device over the wireless network, including complete details received. This may replace or supplement traditional paper receipts.

Figure 10:
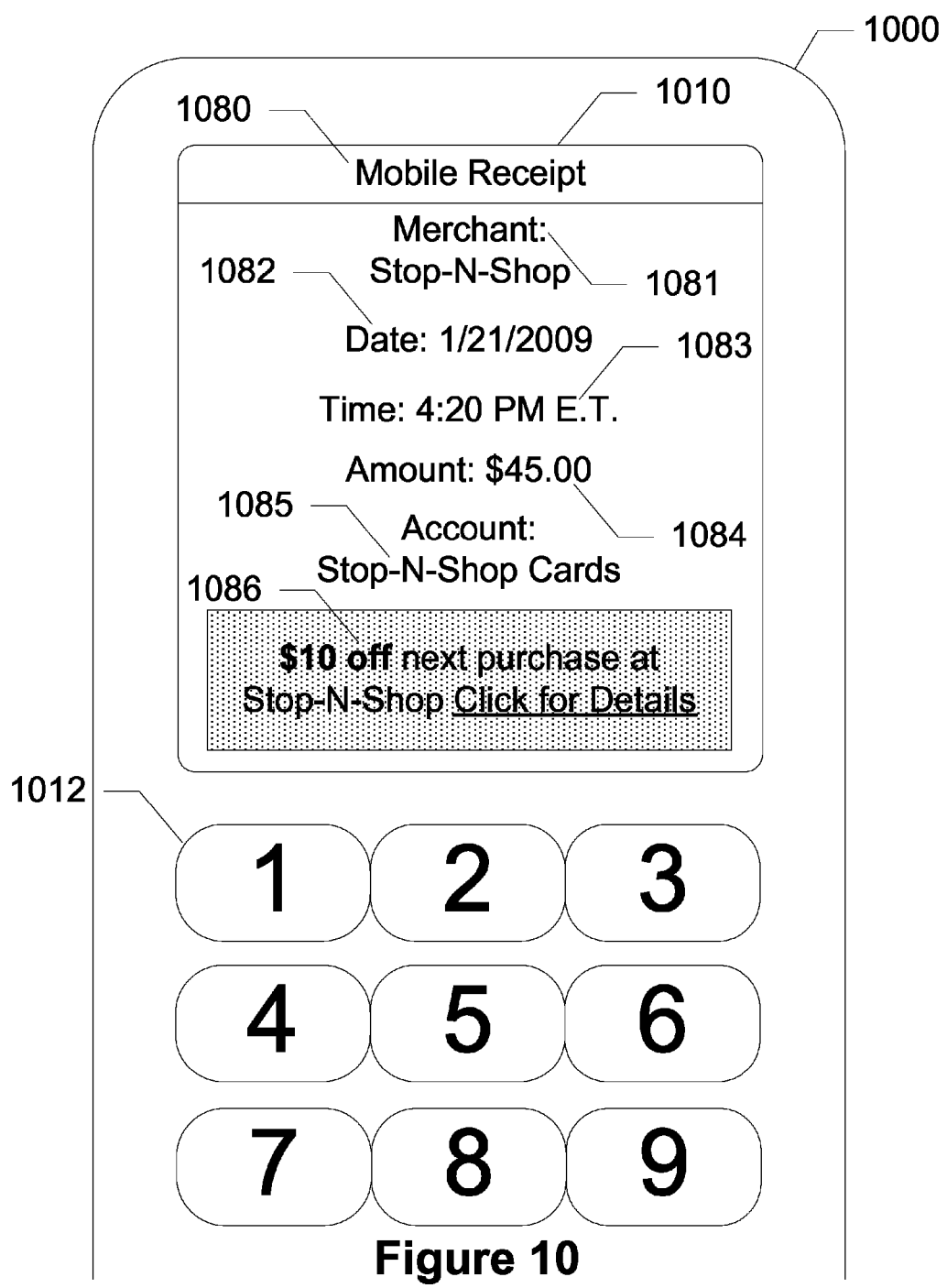
FIG. 10 shows the results of a completed sale between a mobile device and a point-of-sale device, according to an exemplary embodiment of the present invention.

FIG. 10 shows the results of a completed sale between a mobile device 1000 and a point-of-sale device, according to an exemplary embodiment of the present invention. In this embodiment, the point-of-sale device is informed that the sale is complete. The point-of-sale device or payment server sends a mobile receipt 1080 to be displayed on display 1010 of mobile device 1000. Mobile receipt 1080 contains a merchant name or identifier 1081, a date 1082, a time 1083, an amount 1084, and a payment account 1085 used to fulfill the transaction. Receipt 1080 can also include a deal 1086 offered by the merchant, for instance, to a loyal customer or to retain the customer for a subsequent purchase. Deal 1086 may be a coupon or discount for further purchases from that or any other merchant. A keypad 1012 allows the user to respond to deal offered 1086 as well as enter information, etc.

Figure 11:
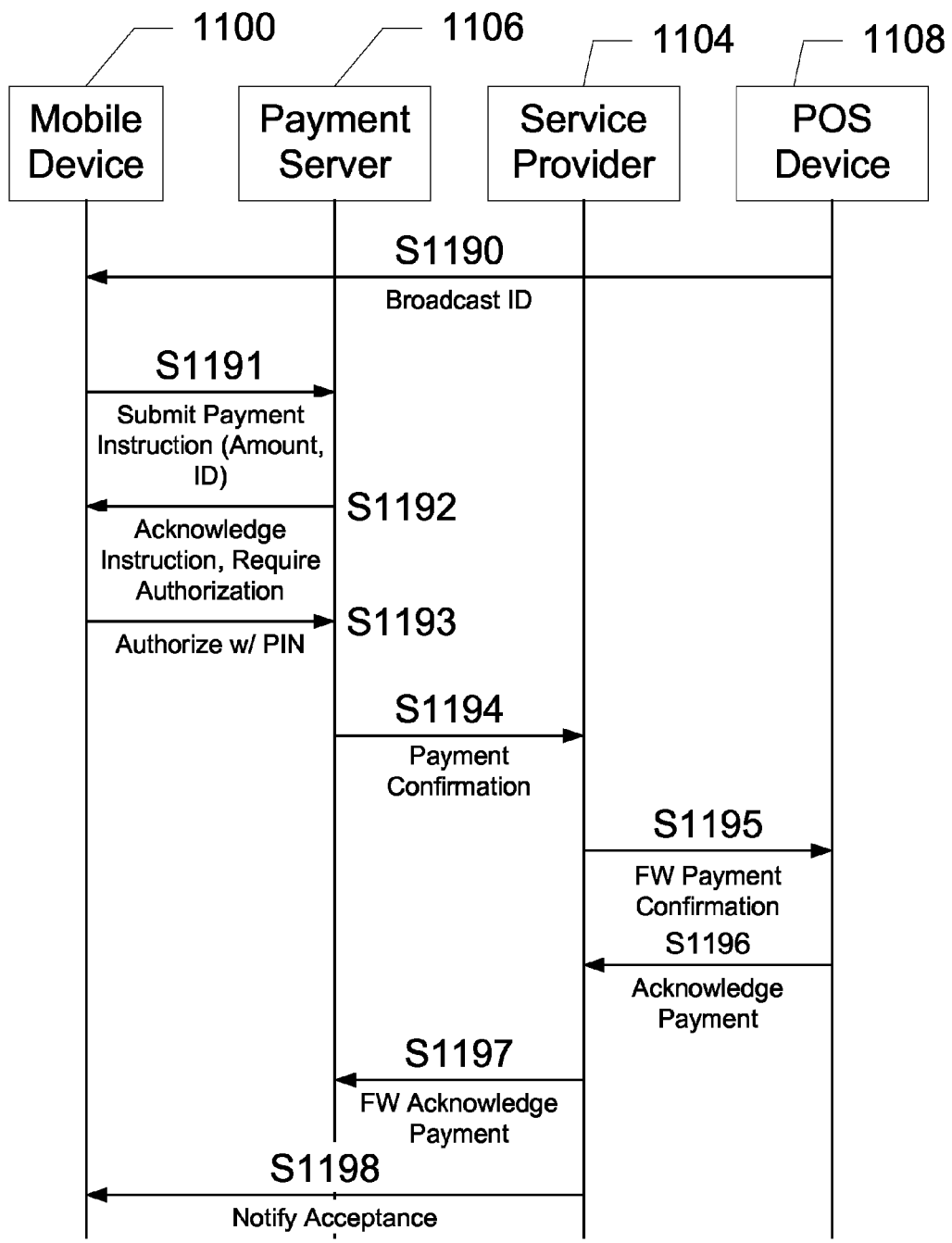
FIG. 11 shows an action diagram between a mobile device, a payment server, a service provider, and a point-of-sale device, according to an exemplary embodiment of the present invention.

FIG. 11 shows an action diagram between a mobile device 1100, a payment server 1106, a service provider 1104, and a point-of-sale device 1108, according to an exemplary embodiment of the present invention. According to this embodiment, point-of-sale device 1108 broadcasts an ID S1190 to mobile device 1100. Mobile device 1100 submits payment instructions S1191 to payment server 1106. Payment instructions include a payment amount, the ID, a payment method, etc. Payment server 1106 acknowledges the instruction and requires authorization S1192 from mobile device 1100. This authorization ensures that the purchase is being made by an appropriate user of mobile device 1100, for instance by inputting a unique code such as a password or PIN code. Mobile device authorizes S1193 payment server 1106 to proceed with the transaction with a code. Payment server 1106 sends a payment confirmation S1194 to service provider 1104. Service provider network 1104 forwards the payment confirmation S1195 to point-of-sale device 1108. Point-of-sale device 1108 sends a payment acknowledgement S1196 to an element in service provider network 1104, such as an application server or an authentication server. Service provider network 1104 forwards the acknowledgement S1197 to payment server 1106 and service provider 1104 also notifies S1198 mobile device 1100 of the acceptance of the payment.

In some embodiments, a network of point-of-sale devices is in communication with a central server but not with the wide area network. The central server is connected to the wide area network, however, and acts as the gateway between the payment server and the individual point-of-sale devices.

Figure 12:
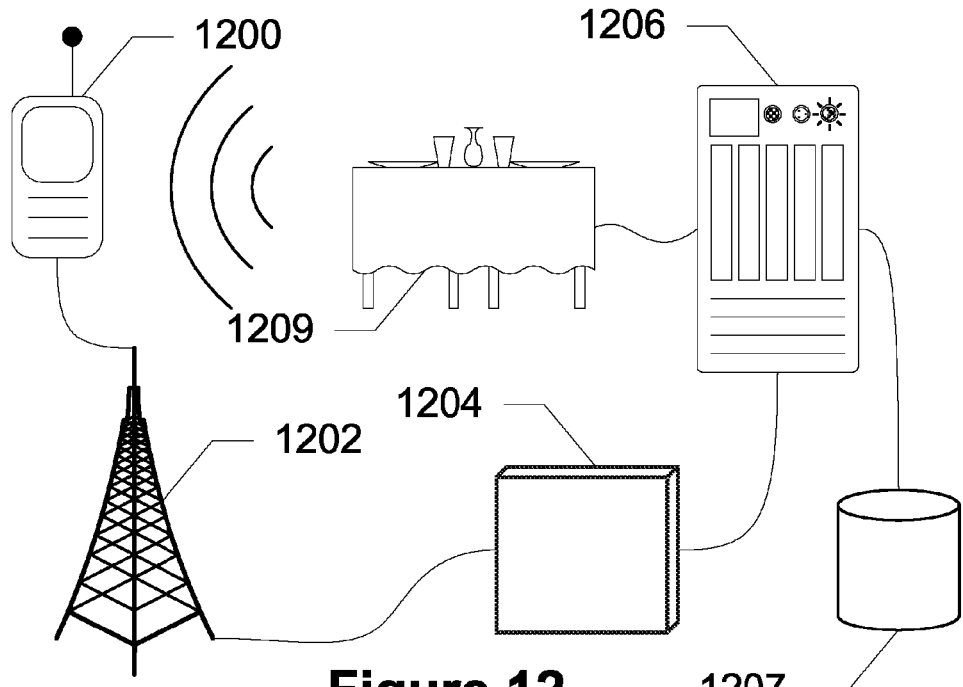
FIG. 12 shows a system used for wireless point-of-sale in a restaurant setting, according to an exemplary embodiment of the present invention.

FIG. 12 shows a system used for wireless point-of-sale in a restaurant setting, according to an exemplary embodiment of the present invention. In this embodiment, mobile device 1200 wirelessly communicates with payment server 1206 through a base station 1202 and a service provider network 1204. Service provider network 1204 may be a cellular network and can additionally serve as a mobile payment gateway, thereby including one or more gateway servers enabling communication with a billing/payment system. In this embodiment, instead of a point-of-sale terminal, a point-of-sale device is incorporated into a point-of-sale table 1209, for instance, a table at a restaurant. The customer can use mobile device 1200 to initiate and complete a purchase at table 1209 without the need of a separate register. The device on point-of-sale table 1209 includes an identifier that is read by mobile device 1200, via near-field communication. Payment logic onboard mobile device 1200 communicates payment information, including a point-of-sale device ID, a payment amount, a payment method, etc. to payment server 1206. Payment server 1206 receives the payment information and processes the payment information. A database 1207 is used to determine the appropriate merchant including the merchant location from the point-of-sale device ID. Database 1207 may also include routing information for all financial transactions being accomplished. In this embodiment, an identifier for POS table 1209 further includes a table ID for the restaurant, whereby gratuity, etc., can be synchronized with a waiter schedule in order to appropriately complete the transaction.

Figure 13:
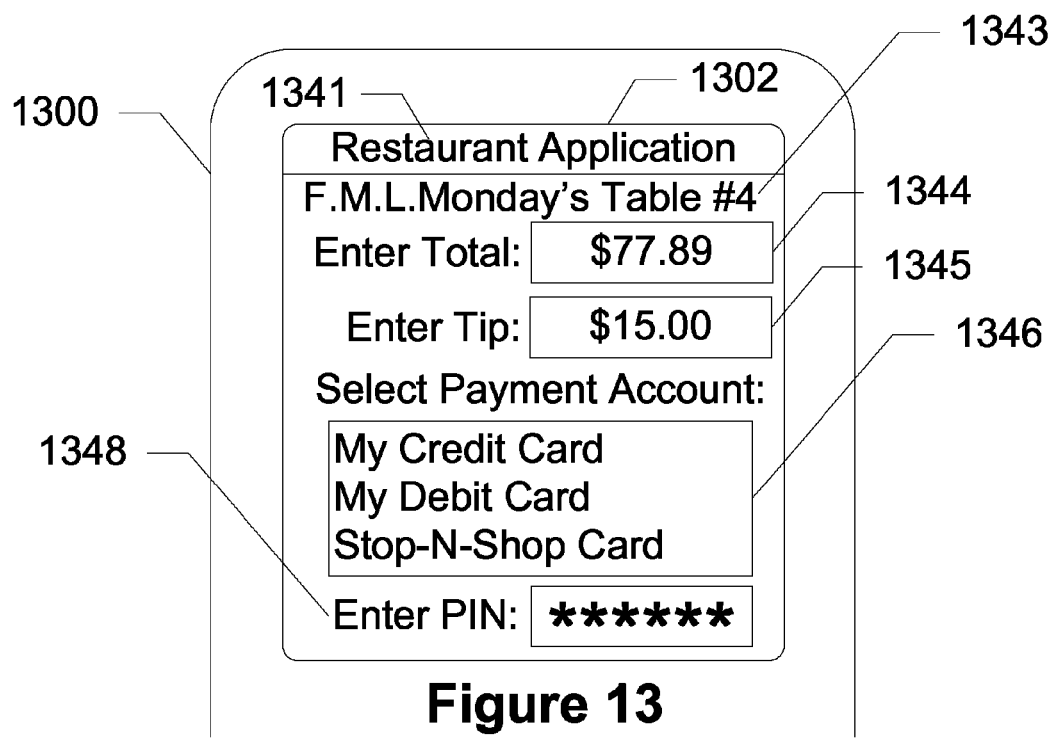
FIG. 13 shows an authorization screen corresponding to a point-of-sale table, according to an exemplary embodiment of the present invention.

When a transaction at a POS table is initiated, an approval screen is generated by payment logic on a screen of the user's mobile device. FIG. 13 shows such an authorization screen 1341 corresponding to a point-of-sale table, according to an exemplary embodiment of the present invention. A screen 1302 on a mobile device 1300 displays the information for the POS table, such as a table number 1343, a sub-total amount 1344, and a tip amount 1345. An account such as the ones previously provisioned can be selected in field 1346. To ensure that the proper user is making the purchase and not someone else in possession of mobile device 1300, an appropriate PIN is required in PIN entry field 1348. Each of these values/choices may be viewed entered or adjusted with a keypad of mobile device 1300. The transaction authorization is then submitted and processed as described above.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
capturing, by a mobile device comprising a processor from a point-of-sale device, identification information corresponding to the point-of-sale device, wherein the mobile device and the point-of-sale device are associated with a transaction;
providing, by the mobile device via a user interface to a user of the mobile device, a first prompt to input a payment method for charges associated with the transaction, a second prompt to input personal identification information associated with the user, and at least a portion of the identification information corresponding to the point-of-sale device;
transmitting, by the mobile device to a payment server, payment information, the payment information comprising the identification information corresponding to the point-of-sale device, the payment method, and the personal identification information associated with the user; and
receiving, at the mobile device from the point-of-sale device, a confirmation of payment for the transaction.

2. The method of claim 1, wherein the identification information corresponding to the point-of-sale device comprises at least one of a serial number associated with the point-of-sale device, a network address associated with the point-of-sale device, or a telephone number associated with the point-of-sale device.

3. The method of claim 1, wherein the point-of-sale device is a cash register.

4. The method of claim 1, wherein capturing the identification information corresponding to the point-of-sale device comprises reading at least one of a radio frequency identification tag or a barcode.

5. The method of claim 1, wherein the confirmation of payment for the transaction comprises an electronic receipt from the point-of-sale device.

6. The method of claim 1, wherein the payment information is transmitted by the mobile device to the payment server via a cellular network.

7. A mobile device comprising:
a processor; and
a memory storing instructions that, when executed by the processor, cause the processor to perform operations comprising
capturing, from a point-of-sale device, identification information corresponding to the point-of-sale device, wherein the mobile device and the point-of-sale device are associated with a transaction,
providing, via a user interface to a user of the mobile device, a first prompt to input a payment method for charges associated with the transaction, a second prompt to input personal identification information associated with the user, and at least a portion of the identification information corresponding to the point-of-sale device,
transmitting, to a payment server, payment information, the payment information comprising the identification information corresponding to the point-of-sale device, the payment method, and the personal identification information associated with the user, and
receiving, from the point-of-sale device, a confirmation of payment for the transaction.

8. The mobile device of claim 7, wherein the point-of-sale device is a cash register.

9. The mobile device of claim 7, wherein the identification information corresponding to the point-of-sale device comprises at least one of a serial number associated with the point-of-sale device, a network address associated with the point-of-sale device, or a telephone number associated with the point-of-sale device.

10. The mobile device of claim 7, wherein capturing the identification information corresponding to the point-of-sale device comprises reading at least one of a radio frequency identification tag or a barcode.

11. The mobile device of claim 7, wherein the confirmation of payment for the transaction comprises an electronic receipt from the point-of-sale device.

12. The mobile device of claim 7, wherein the payment information is transmitted by the mobile device to the payment server via a cellular network.

13. The mobile device of claim 7, wherein the point-of-sale device is enabled to communicate with at least one of the mobile device and the payment server via a packet-based network.

14. The mobile device of claim 7, wherein the point-of-sale device is enabled to communicate with at least one of the mobile device and the payment server via a cellular network.

15. A non-transitory computer readable medium storing instructions that, when executed by a processor of a mobile device, cause the processor to perform operations comprising
capturing, from a point-of-sale device, identification information corresponding to the point-of-sale device, wherein the mobile device and the point-of-sale device are associated with a transaction;
providing, via a user interface to a user of the mobile device, a first prompt to input a payment method for charges associated with the transaction, a second prompt to input personal identification information associated with the user, and at least a portion of the identification information corresponding to the point-of-sale device;
transmitting, to a payment server, payment information comprising the identification information corresponding to the point-of-sale device, the payment method, and the personal identification information associated with the user; and
receiving, from the point-of-sale device, a confirmation of payment for the transaction.

16. The non-transitory computer readable medium of claim 15, wherein the identification information corresponding to the point-of-sale device comprises at least one of a serial number associated with the point-of-sale device, a network address associated with the point-of-sale device, or a telephone number associated with the point-of-sale device.

17. The non-transitory computer readable medium of claim 15, wherein the point-of-sale device is a cash register.

18. The non-transitory computer readable medium of claim 15, wherein capturing the identification information corresponding to the point-of-sale device comprises reading at least one of a radio frequency identification signal or a barcode.

19. The non-transitory computer readable medium of claim 15, wherein the confirmation of payment for the transaction comprises an electronic receipt from the point-of-sale device.

20. The non-transitory computer readable medium of claim 15, wherein the payment information is transmitted by the mobile device to the payment server via a cellular network.

* * * * *